June 14, 1966     H. J. GRIEB     3,255,584
TWO STAGE GAS TURBINE PROPULSION JET
UNIT WITH THRUST DIVERTING MEANS
Filed Aug. 12, 1963     2 Sheets-Sheet 1
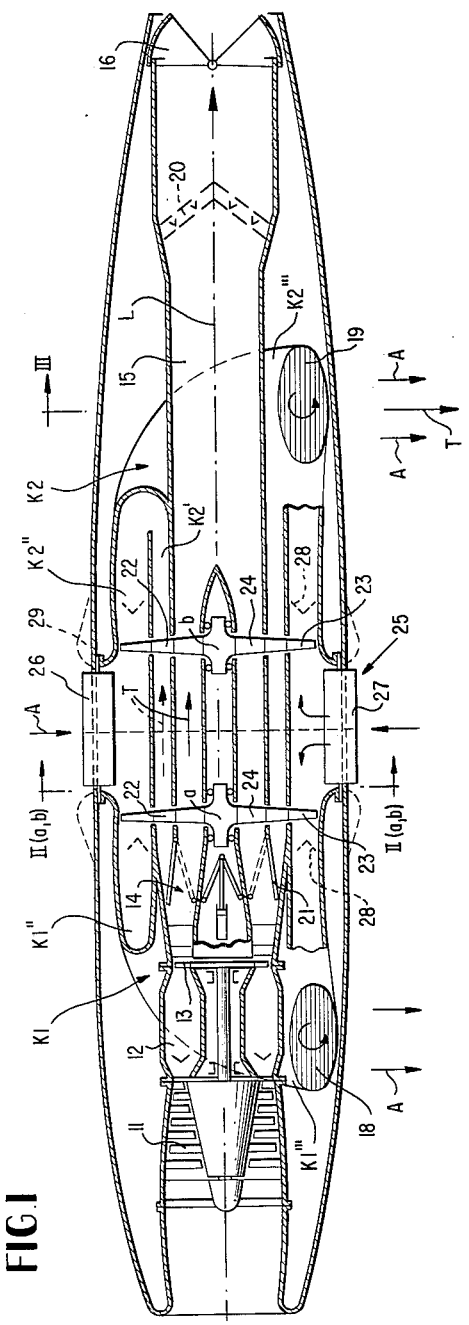
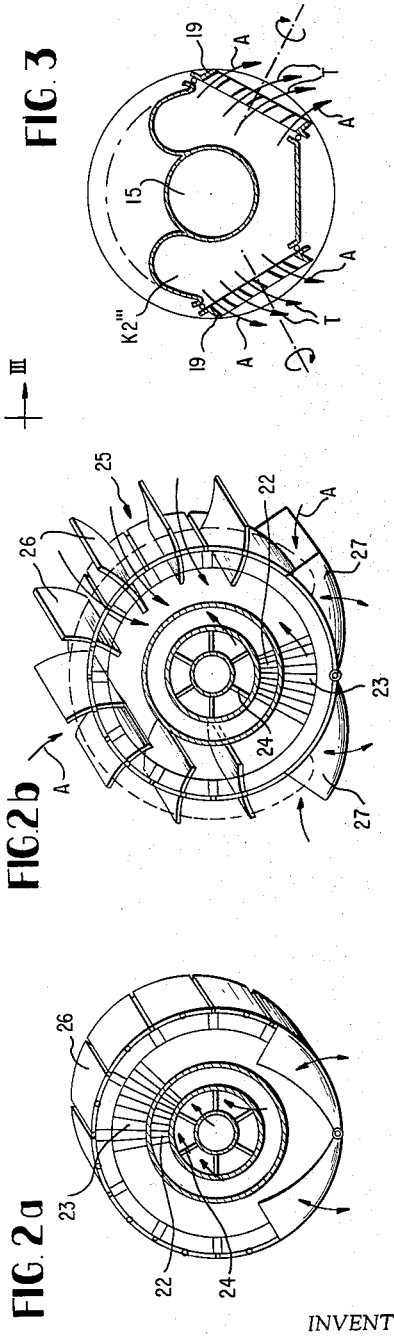
INVENTOR.
HUBERT J. GRIEB
BY
*Dicke and Craig*
ATTORNEYS

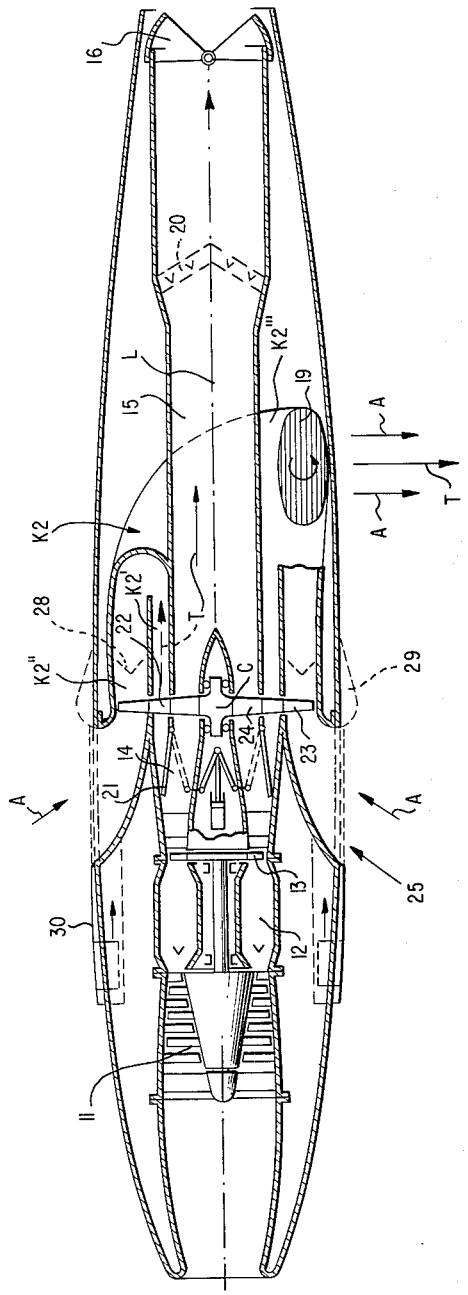

United States Patent Office 3,255,584
Patented June 14, 1966

3,255,584
TWO STAGE GAS TURBINE PROPULSION JET
UNIT WITH THRUST DIVERTING MEANS
Hubert J. Grieb, Stuttgart-Botnang, Germany, assignor to
Daimler-Benz Aktiengesellschaft, Stuttgart-Unterturkheim, Germany
Filed Aug. 12, 1963, Ser. No. 301,452
Claims priority, application Germany, Aug. 18, 1962,
D 39,648
23 Claims. (Cl. 60—35.54)

The present invention relates to a two-stage gas turbine jet propulsion unit for propelling vertical take-off and short take-off airplanes, of which the first stage consists of one or several air compressors, one or several combustion chambers, one or several compressor drive turbines, and a channel bifurcation controlled by flaps or the like members which continues in a horizontal thrust channel extending in the direction of the longitudinal axis of the propulsion unit, and in a lift channel bent perpendicularly or approximately perpendicularly to the longitudinal axis of the turbine propulsion unit, within which rotate the turbine blades of lift compressor rotors which draw in atmosphere for the second stage and also supply it to the aforementioned lift channel.

Two-stage jet propulsion units for vertical take-off planes are known in the art, of which the gas generators together with the horizontal thrust channel are arranged, for example, below the airfoil wing, while a lift compressor rotor is built-in horizontally into the fuselage or preferably within the airplane wing, which lift compressor rotor comprises turbine blades radially outwardly thereof and compressor blades radially inwardly thereof. The turbine blades of the lift compressor rotor are supplied with propulsion gases from the gas generator of the first propulsion unit stage by way of a channel branched off from the horizontal thrust channel and by an annular channel extending around the compressor rotor. The channel bifurcation is thereby controlled by a flap which renders it possible to guide the propulsion gases either only through the horizontal thrust channel or only to the turbine blade ring of the lift compressor rotor or—with intermediate positions of the control flap—to cause the propulsion gases to flow both into the horizontal thrust channel as well as also to the lift compressor rotor so that lift and thrust components are generated for intermediate or transitional flights.

The disadvantages and drawbacks of these known propulsion units reside primarily in that the airplane wing is structurally impaired by the installation of the large-surfaced lift compressor rotor, which will lead to complications particularly with the relatively thin wings of modern high-speed aircrafts. A further disadvantage consists in that the outwardly provided turbine can only be loaded partially, which affects adversely the turbine efficiency. Moreover, the necessity of a short and as straight as possible a connection between the lift unit and the thrust unit of the propulsion system will unfavorably influence, under certain conditions, the overall concept of an airplane.

Also known in the prior art for the installation in vertical take-off airplanes are gas turbine jet propulsion units with a two-stage forward compressor wherein one of the compressor stages supplies compressed air to the gas generator whereas the air compressed in the second compressor stage flows into a thrust channel with two pivotal thrust nozzles arranged laterally forwardly on the propulsion unit and directed obliquely downwardly, for the vertical and the transitional as well as the horizontal flight. Also the hot propulsion gases leaving the compressor drive turbines are guided into a thrust channel with two pivotally positioned thrust nozzles, provided laterally rearwardly on the propulsion unit, for the horizontal and vertical flight.

A disadvantage of this latter propulsion unit arrangement consists in that the forward diameter thereof becomes rather large due to the two-stage forwardly disposed compressor and the pivotable thrust nozzles. A further important drawback consists in that even in supersonic airplanes, a considerably higher thrust is needed for starting than for the horizontal flight so that the propulsion unit has to be throttled in the latter flying condition. It is, therefore, impossible to provide with this type of prior art propulsion unit an arrangement which is equally favorable and optimal for the start or take-off as well as for the normal flight. Additionally, only relatively small bypass conditions are structurally possible in this type of propulsion unit. For the start or take-off, however, the bypass condition should be as high as possible with regard to the fuel consumption and jet velocity, bearing a definite relation to ground erosion and noise, while relatively low bypass conditions are favorable during the normal flight. Although the consumption rates of two-stage gas turbine propulsion units are more favorable than those of one-stage propulsion units, with the use of lift-thrust propulsion units of known construction the consumption during horizontal flight will be larger than that of one-stage propulsion units with the same thrust, since the two-stage propulsion unit has to be throttled. Another disadvantage resides in the fact that the large required air inlet, on the one hand, and the pivotable nozzles which remain also in operation during the horizontal flight, on the other hand, entail a shape of the airplane fuselage which is aerodynamically by no means optimal.

The present invention aims at the elimination of the aforementioned disadvantages and drawbacks. In contrast to the propulsion units and systems known in the prior art, the two-stage jet propulsion unit in accordance with the present invention is characterized by the fact that the section of the lift channel sysem positioned ahead of the curved or elbow portions, as viewed in the direction of the lift flow, consists of a turbine channel section coaxially disposed around the concentrically-extending horizontal thrust channel and connected to the channel bifurcation of the first propulsion unit stage which is positioned behind the compressor drive turbine, and of an air channel part or section surrounding or jacketing the aforementioned turbine channel section and provided with an air inlet disposed along the circumference of the propulsion unit, and by the fact that the lift compressor rotor or rotors extending perpendicularly to the longitudinal axis of the propulsion unit, carry radially outwardly thereof the air compressor blade ring, radially centrally thereof the turbine blade ring, and radially inwardly thereof a set of spokes rotating within the horizontal thrust channel and aerodynamically ineffectual.

A further feature of the present invention resides in that the lift channel system consists of two branched channel sections which are bifurcated to the rear of the air inlet, and more particularly of a forward channel branch section initially directed forwardly and subsequently bent downwardly, through which only air of the second propulsion unit stage is supplied, and of a rearward channel branch section which is initially directed rearwardly and then bent downwardly and which is supplied with propulsion gases of the first propulsion unit stage and with air of the second propulsion unit stage, which surrounds or jackets the hot propulsion gases.

Additionally, it is proposed in accordance with the present invention to provide two lift compressor rotors of which one rotor is arranged within the forward channel branch section and the other rotor is arranged in the rearward channel branch section.

In order to compensate for any gyroscopic moments of the lift compressor rotors, it is advantageous to cause in accordance with the present invention the two rotors to rotate in mutually opposite directions.

The air inlet or inflow into the second propulsion unit stage takes place, according to the present invention, over the entire or approximately over the entire circumference of the propulsion unit and is controlled by adjustable elements, such as flaps, or the like.

The following advantages are achieved by the present invention:

The propulsion unit as a whole is equally suitable for installation in the airplane fuselage or in the nacelles. For this reason, a favorable arrangement is possible, for example, of an after-burner installation within the flow channel ahead of the horizontal thrust nozzles in the tail section of the fuselage. In contrast to the known two-stage propulsion units having a forwardly disposed two-stage compressor in which the pivotable lift-thrust nozzles are loaded constantly and therefore have to be spaced from the walls of the plane fuselage a relatively large distance, the pivotable thrust nozzles of the lift installation in accordance with the present invention are in operation only during vertical flights and transitional flying conditions so that they may be installed more favorably in the walls of the fuselage. The radially outwardly disposed lift compressor blades and the radially-inwardly disposed turbine blades permit of any desired large bypass condition, that is, compressor flow rate/propulsion unit flow rate, which will result in a ratio between horizontal thrust and vertical thrust that may be varied within relatively wide limits so that a favorable adaptation is possible for airplanes with different speed ranges.

With an arrangement or two rotors, one for a forward lift branch channel section and one for a rearward lift branch channel section, the turbines are flow-dynamically connected in series. The turbine head is thereby subdivided which has a favorable effect on the aerodynamic load of the turbines. For that reason, relatively high bypass conditions may still be realized in a one-stage arrangement of the turbines with a still relatively high degree of efficiency. Only with extremely large bypass conditions is it advisable to equip the compressor rotors with two turbine stages. This will not require, however, any additional space since the distance between two compressor rotors, which has to be present in view of the inflow of the air of the second stage, need not be increased.

For all of the foregoing reasons, particularly in view of the large bypass condition, there will result a specific, low fuel consumption for start and landing, extremely low jet stream velocities during take-off and landing to avoid ground erosions and noise, and a low compression ratio of the lift compressors and therewith a high flexibility in the operating behavior. Moreover, each of the two air inlets for the horizontal thrust part and the lift part of the overall installation may be arranged and constructed in an optimum manner according to its function, whereby the relatively small air inlet for the horizontal thrust part may be readily accommodated in the structure of the airplane fuselage, while the relatively large air inlet of the lift installation, distributed over the entire circumference of the fuselage, does not require any additional fuselage cross section. The air inlet of the lift unit is closed during the horizontal flight so that it cannot exert any negative influence on the aerodynamics of the airplane. Calculations have shown that with two lift compressor rotors, the required cross section for the fuselage or nacelle is considerably smaller, even in case of an extremely high bypass condition, than with comparable known lift-thrust propulsion units. Even with a single compressor rotor, the required cross section of the fuselage or nacelle is larger only in case of extremely high bypass conditions than that necessitated for the known lift-thrust propulsion units which do not attain such extremely high bypass conditions.

Furthermore, the outer cold air jet of the second propulsion unit stage forms in the rearward lift channel branch section a heat-insulating jacket about the inner, hot propulsion gas jet of the first propulsion unit stage.

Accordingly, it is an object of the present invention to provide a two-stage gas-turbine propulsion unit of the type described hereinabove which effectively avoids the drawbacks and shortcomings encountered with the prior art constructions yet enables a relatively simple installation from constructional points of view that do not require additional expenditures over and above those of the prior art constructions.

Another object of the present invention resides in the provision of gas-turbine propulsion units for airplanes, particularly vertical take-off and short take-off aircrafts which are so constructed as not to impair the aerodynamic design of the craft, especially which are so constructed as not to lead to complications in the supersonic wing structures of presently known aircraft designs.

Still another object of the present invention resides in the provision of a two-stage gas-turbine propulsion unit which assures a high degree of efficiency of the turbine operation under all flight conditions, that is, during vertical take-off and landing as well as during normal flights.

A further object of the present invention resides in the provision of a gas turbine propulsion unit for aircrafts which permits optimum utilization of the propulsion units for vertical take-off and horizontal flight conditions, even with supersonic speeds and which enables relatively large bypass conditions without excessive encumberances of the construction.

Still another object of the present invention resides in the provision of a gas-turbine propulsion unit for vertical take-off planes that offers relatively low fuel consumption under all operating conditions, permits of relatively small dimensions of the propulsion installation and of the airplane parts enclosing the same, and which also permits an optimum design of the airplane fuselage notwithstanding the existence of adjustable inlet apertures provided therein.

A further object of the present invention resides in the provision of a gas-turbine propulsion unit for vertical take-off planes that may be readily installed within a given airplane fuselage, permits the use of an afterburner installation and which enables the choice, within relatively wide limits, of suitable ratios between the horizontal and vertical thrusts for good adaptation to planes with different velocity ranges.

Another object of the present invention resides in the provision of gas-turbine propulsion units for a vertical take-off plane in which the pressure heads of the turbines are effectively subdivided thereby providing good aerodynamic loading of the turbines.

Still a further object of the present invention resides in the provision of a gas-turbine propulsion unit for vertical take-off planes which assures relatively low jet velocities during take-off and landing notwithstanding a relatively low specific fuel consumption during the take-off and starting operations coupled with relatively large bypass conditions and high flexibility in the operation thereof.

Another object of the present invention resides in the provision of a gas-turbine propulsion unit for vertical take-off planes in which the installations producing the horizontal and vertical thrusts may each be constructed in an optimum manner without the danger of mutual interference resulting in an adverse influence on the aerodynamics of the airplane.

Still another object of the present invention resides in the provision of a gas-turbine propulsion unit of the type described hereinabove in which the lift unit is so constructed and arranged as to provide a relatively effective heat-insulating jacket consisting of cool air for the hot propulsion gases derived from the gas generator.

These and other objects, features, and advantages of the present invention will become more obvious from the following description, when taken in connection with the accompanying drawing, which shows, for purposes of illustration only, two embodiments in accordance with the present invention, and wherein FIGURE 1 is a longitudinal cross-sectional view through a two-stage propulsion unit with two thrust compressor rotors in accordance with the present invention;

FIGURE 2a is a cross-sectional view, taken along line II—II of FIGURE 1 with the air inlet flaps of the compressor thrust stage in the closed position thereof;

FIGURE 2b is a cross-sectional view, also taken along line II—II of FIGURE 1, with the air inlet flaps of the compressor thrust stage in the open position thereof;

FIGURE 3 is a cross-sectional view taken along line III—III of FIGURE 1, and

FIGURE 4 is a longitudinal cross-sectional view through a modified two-stage propulsion unit having a single thrust compressor rotor in accordance with the present invention.

Referring now to the drawing wherein like reference numerals are used throughout the various views to designate like parts, the first stage of the propulsion units of FIGURES 1 and 4 consists essentially of an air compressor 11, of a plurality of combustion chambers 12, of a compressor drive turbine 13, and of a channel bifurcation generally designated by reference numeral 14 which is adjoined, on the one hand, by horizontal thrust channel 15, provided with a horizontal thrust nozzle 16 having an adjustable cross section. The entire lift channel system according to FIGURE 1 consists of a forward branch lift channel section generally designated by reference character $K_1$ and of a rear branch lift channel section generally designated by reference character $K_2$. The lift channel system according to FIGURE 4 has only a rear channel branch section generally designated by reference character $K_2$.

The channel bifurcation 14, which is controlled by a flap 21 is adjoined, on the other hand, by a turbine channel section $K_2'$ which is surrounded or jacketed by an air channel section $K_1''$ and $K_2''$, respectively, at the ends of which are provided pivotable thrust nozzles 18 and 19. The channel sections $K_2'$, $K_1''$ and $K_2''$ thus extend coaxially about the forward part of the horizontal thrust channel 15. An after-burner installation 20 may be provided in the rearward part of the horizontal thrust channel 15.

Two lift compressor rotors $a$ and $b$ (FIG. 1) are freely rotatably supported in the engine housing of the propulsion unit of FIGURE 1. In FIGURE 4, only a single such lift compressor rotor $c$ is freely rotatably supported in the engine housing thereof. The rotors $a$ and $b$ or $c$ carry turbine blades 22 which rotate within the propulsion gas channel section $K_2'$, and air compresor blades 23 which rotate within the air channel sections $K_1''$ and $K_2''$, respectively. Moreover, the rotors $a$ and $b$ or $c$ are provided with aerodynamically ineffectual spokes 24 which rotate within the thrust channel 15.

The air inlet generally designated by reference numeral 25 of the second propulsion unit stage, i.e., of the lift compressor stage, is controlled by pivotable flaps 26 and air scoops 27, adapted to be extended and retracted, within the lower part of the circumference of the propulsion unit. Instead of air inlet flaps 26 and air inlet scoops 27, a tubular slide member 30 is provided in FIGURE 4. Inflatable edges or bulges 29 improve, during suspended and intermediate flights, the aerodynamic conditions of the propulsion unit and of the airplane.

It is, of course, well possible within the scope of the present invention to arrange within the thrust channel 17 fuel injection devices 28 for increasing the thrust.

OPERATION

The operation of the illustrated propulsion units is as follows:

During suspended and intermediate flights, the control flaps 21 are in the position thereof shown in dash lines, i.e., the horizontal flight channel 15 is blocked. The propulsion gases T leaving the compressor drive turbine 13 flow into the lift channel system, thereby loading or acting on the turbine blades 22, rotating within the channel section $K_2'$, of rotors $a$ and $b$ or $c$, and then flow through the bent or elbow portion $K_2''$, whereupon they leave the propulsion unit through the pivotable thrust nozzles 19. The air inlet flaps 26 and scoops 27 or the slide member 30, respectively, are in the open position in the aforementioned flight conditions so that atmospheric air A may flow in, which is drawn in, compressed, and supplied to the elbow portion $K_2''$ by the compressor blades 23. The propulsion gas jet leaving the two thrust nozzles 19 is thus composed of an inner hot tubular jet stream consisting of turbine gases T and of an outer jacketing stream consisting of compressed, considerably colder air A. Only relatively cold air A is supplied by the compressor rotor $a$ through the lift branch channel section $K_1$ (FIG. 1), which is discharged through the two forward thrust nozzles 18. The thrust nozzles 18 and 10 are so constructed and adjustable arranged in a manner, known per se, that the propulsion gases T or A and T, respectively, are able to flow out in the form of from vertically to horizontally directed jets.

During the horizontal flight, the control flap 21 assumes the position illustrated in the drawing in full lines; the air inlet elements 26 and 27 or 30, respectively, thereby close the fuselage about the nacelle and therewith seal the compressor thrust stage against the outside. The propulsion gases T will then flow exclusively through the horizontal thrust channel 15 without driving the lift compressor rotors $a$ and $b$ or $c$ since the spokes 24 thereof are aerodynamically ineffective.

While I have shown and described herein two embodiments in accordance wth the present invention, it is understood that the same is not limited thereto, but is susceptible of many changes and modifications within the spirit and scope of the present invention; and I, therefore, do not wish to be limited to the details shown and described herein, but intend to cover all such changes and modifications as are encompassed by the scope of the appended claims.

I claim:

1. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means;

a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means.

2. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means;

a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift channel means being effectively provided with two channel branch sections which branch off to the rear of said air inlet means, as viewed in the direction of flow of the outside air, one of said branch sections being a forward, initially forwardly directed and subsequently downwardly bent lift-channel branch section forming one of said elbow section means through which is supplied the air of the second propulsion unit stage, and the other branch section being a rear, initially rearwardly directed and subsequently downwardly bent lift-channel branch section forming the other of said elbow section means which is supplied with propulsion gases of the first propulsion unit stage and with air of the second propulsion unit stage jacketing the hot propulsion gases.

3. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift channel means being effectively provided with two channel branch sections which branch off to the rear of said air inlet means, as viewed in the direction of flow of the outside air, one of said branch sections being a forward, initially forwardly directed and subsequently downwardly bent lift-channel branch section forming one of said elbow section means through which is supplied the air of the second propulsion unit stage, and the other branch section being a rear, initially rearwardly directed and subsequently downwardly bent lift-channel branch section forming the other of said elbow section means which is supplied with propulsion gases of the first propulsion unit stage and with air of the second propulsion unit stage jacketing the hot propulsion gases, said lift compressor rotor means including two rotors, one of said last-mentioned rotors being arranged within the forward lift-channel branch section and the other in the rear lift-channel branch section.

4. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift channel means being effectively provided with two channel branch sections which branch off to the rear of said air inlet means, as viewed in the direction of flow of the outside air, one of said branch sections being a forward, initially forwardly directed and subsequently downwardly bent lift-channel branch section forming one of said elbow section means through which is supplied the air of the second propulsion unit stage, and the other branch section being a rear, initially rearwardly directed and subsequently downwardly bent lift-channel branch section forming the other of said elbow section means which is supplied with propulsion gases of the first propulsion unit stage and with air of the second propulsion unit stage jacketing the hot propulsion gases, said lift compressor rotor means including two rotors, one of said last-mentioned rotors being arranged within the forward lift-channel branch section and the other in the rear lift-channel branch section, the direction of rotation of the two last-mentioned rotors being in opposite directions.

5. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift compressor rotor means including two rotors, one of said last-mentioned rotors being arranged within the forward lift-channel branch section and the other in the rear lift-channel branch section.

6. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust with said channel branching channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift compressor rotor means including two rotors, one of said last-mentioned rotors being arranged within the forward lift-channel branch section and the other in the rear lift-channel branch section, the direction of rotation of the two last-mentioned rotors being in opposite directions.

7. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and, on the other, in lift channel means having a first section operatively connected with said channel branching means and surrounding said horizontal thrust channel means substantially coaxially, a second section surounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means, and said second section forming an air channel section provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, each of said lift compressor rotor means being provided with two turbine stages formed by two turbine blade rings.

8. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and extending substantially in the longitudinal axis of the propulsion unit and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in outside air for said second stage and supply the same to said lift channel means, said first and second sections being disposed ahead of the respective elbow section means, as viewed in the direction of the flow of the lift medium, and said second section forming an air channel section surrounding said turbine channel section and being provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that are aerodynamically ineffectual and rotate within said horizontal thrust channel means, said lift channel means being effectively provided with two channel branch sections which branch off to the rear of said air inlet means, as viewed in the direction of flow of the outside air, one of said branch sections being a forward, initially forwardly directed and subsequently downwardly bent lift-channel branch section forming one of said elbow section means through which is supplied the air of the second propulsion unit stage, and the other branch section being a rear, initially rearwardly directed and subsequently downwardly bent lift-channel branch section forming the other of said elbow section means which is supplied with propulsion gases of the first propulsion unit stage and with air of the second propulsion unit stage jacketing the hot propulsion gases, said lift compressor rotor means including two rotors, one of said last-mentioned rotors being arranged within the forward lift-channel branch section and the other in the rear lift-channel branch section, the direction of rotation of the two last-mentioned rotors being in opposite directions, each of said lift compressor rotor means being provided with two turbine stages formed by two turbine blade rings.

9. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that rotate within said horizontal thrust channel means, and radially intermediate therebetween turbine blade means disposed within said first section.

10. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that rotate within said horizontal thrust channel means, and radially intermediate therebetween turbine blade means disposed within said first section, the air inlet means of the second cycle effectively taking place approximately over the entire circumference of the propulsion unit, and adjustable control means for controlling said last-mentioned air inlet means.

11. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and extending substantially in the longitudinal axis of the propulsion unit and, on the other, in lift channel means having a first section operatively connected with said channel branching means and surrounding said horizontal thrust channel means, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in atmospheric air for said second stage and supply the same to said lift channel means, and said second section effectively constituting an air channel section surrounding said first channel section and being provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that rotate within said horizontal thrust channel means, the air inlet means of the second stage effectively taking place approximately over the entire circumference of the propulsion unit, and adjustable control means for controlling said last-mentioned air inlet means including extensible and retractable air scoop means provided within the lower region of the propulsion unit circumference for the control of the air inlet means, and pivotal flap means arranged in the remaining portion of the propulsion unit circumference.

12. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that rotate within said horizontal thrust channel means, and radially intermediate therebetween turbine blade means disposed within said first section, fuel injection means provided within at least some of the air channel sections of the second propulsion unit cycle for additionally reinforcing the lift effect.

13. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and extending substantially in the longitudinal axis of the propulsion unit and, on the other, in lift channel means having a first section operatively connected with said channel branching means and surrounding said horizontal thrust channel means, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in atmospheric air for said second stage and supply the same to said lift channel means, and said second section effectively forming an air channel section surrounding said first channel section and provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that rotate within said horizontal thrust channel means, the air inlet means of the second stage effectively taking place approximately over the entire circumference of the propulsion unit, and adjustable control means for controlling said last-mentioned air inlet means including tubular slide means movable in the axial direction for selectively controlling the air inlet means of said second stage.

14. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle, and, on the other, in lift channel means having a first section operatively connected with said channel branching means and surrounding said horizontal thrust channel means, a second section surrounding said first section and elbow section means operatively connected with at least one of said first and second sections and bent approximately at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that rotate within said horizontal thrust channel means, and two lateral downwardly and outwardly directed pivotally arranged thrust nozzle means provided at the end of each respective elbow section means.

15. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that rotate within said horizontal thrust channel means, and radially intermediate therebetween turbine blade means disposed within said first section, and after-burner means in the horizontal thrust channel means of the first propulsion unit stage.

16. In a two-stage gas turbine jet propulsion unit, for propelling vertical take-off and short take-off aircrafts, which includes a first propulsion unit cycle with air compressor means, combustion chamber means and compressor-drive turbine means; a channel system including a channel bifurcation operatively connected with the output of said turbine means and continuing, on the one hand, in a horizontal thrust channel and extending substantially in the longitudinal axis of the propulsion unit and, on the other, in lift channel bent at an angle to said longitudinal axis, and control means in said bifurcation operable to selectively control the opening and closing of said thrust and lift channels; and a second propulsion unit cycle including lift compressor rotor means operable to draw in atmospheric air for said second cycle and supply the same to said lift channel, and air inlet means for the second cycle disposed along the circumference of the propulsion unit, the improvement essentially consisting of blade means carried by said lift compressor rotor means including air compressor blade means disposed radially outwardly thereof, a set of spokes radially inwardly thereof that are aerodynamically substantially ineffectual and rotate within said thrust channel means, and turbine blade means intermediate said air compressor blade means and said spokes.

said lift channel including an initially approximately longitudinally directed and subsequently downwardly bent lift-channel branch which is supplied with propulsion gases of the first propulsion unit cycle and with air of the second propulsion unit cycle.

17. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that rotate within said horizontal thrust channel means, and radially intermediate therebetween turbine blade means disposed within said first section, one of said elbow section means being supplied with propulsion gases of the first propulsion cycle and with air of the second propulsion unit cycle jacketing the hot propulsion gases of the first cycle.

18. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle, and, on the other, in lift channel means having a first section operatively connected with said channel branching means and surrounding said horizontal thrust channel means, a second section surrounding said first section and elbow section means operatively connected with at least one of said first and second sections and bent approximately at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that rotate within said horizontal thrust channel means, the air inlet means of the second stage effectively taking place approximately over the entire circumference of the propulsion unit, and adjustable control means for controlling said last-mentioned air inlet means, fuel injection means provided within at least some of the air channel sections of the second propulsion unit stage for additionally reinforcing the lift effect, and two lateral downwardly and outwardly directed pivotally arranged thrust nozzle means provided at the end of each respective elbow section means.

19. A two-stage gas turbine jet propulsion unit, for propelling vertical take-off and short take-off aircrafts, comprising:

a first propulsion unit stage including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first stage and extending substantially in the longitudinal axis of the propulsion unit and, on the other, in lift channel means having a first section operatively connected with said channel branching means and surrounding said horizontal thrust channel means, a second section surrounding said first section and elbow section means operatively connected with said first and second sections and bent approximately at right angle to said longitudinal axis, and control means in said channel branching means and operable to selectively control the opening and closing of said thrust and lift channel means, a second propulsion unit stage including said lift channel means and lift compressor rotor means operable to draw in atmospheric air for said second stage and supply the same to said lift channel means, and said second section effectively constituting an air channel section surrounding said first channel section and being provided with air inlet means disposed along the circumference of the propulsion unit, and said lift compressor rotor means carrying radially outwardly thereof air compressor blade means disposed in said second section, radially centrally thereof turbine blade means disposed within said first section and radially inwardly thereof a set of spokes that rotate within said horizontal thrust channel means, the air inlet means of the second stage effectively taking place approximately over the entire circumference of the propulsion unit, and adjustable control means for controlling said last-mentioned air inlet means including extensible and retractable air scoop means provided within the lower region of the propulsion unit circumference for the control of the air inlet means, and pivotal flap means arranged in the remaining portion of the propulsion unit circumference, fuel injection means provided within at least some of the air channel sections of the second propulsion unit stage for additionally reinforcing the lift effect, and two lateral downwardly and outwardly directed pivotally arranged thrust nozzle means provided at the end of each respective elbow section means.

20. A two-cycle gas turbine jet propulsion unit, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means forming part of said first cycle and, on the other, in lift channel means having a first section operatively connected with said channel branching means and surrounding said horizontal thrust channel means, a second section surrounding said first section and elbow section means operatively connected with at least one of said first and second sections and bent at an angle to the longitudinal axis of the unit, and control means in said channel branching means and operable to selectively control the opening and closing of said thrust and lift channel means, a second propulsion unit cycle including said lift channel means and lift compressor rotor means operable to draw in atmospheric air for said second cycle and supply the same to said lift channel means, and air inlet means in communication with said second section and disposed along the circumference of the propulsion unit, and said lift compressor rotor means carrying radially outwardly thereof air compressor blade means disposed in said second section, radially inwardly thereof a set of spokes that are aerodynamically substantially ineffectual and rotate within said horizontal thrust channel means, and radially intermediate therebetween turbine blade means disposed within said first section, one of said elbow section means which being supplied with propulsion gases of the first propulsion unit cycle and with air of the second propulsion unit cycle jacketing therein the hot propulsion gases of the first cycle, the air inlet means of the second cycle effectively taking place approximately over the entire circumference of the propulsion unit, and adjustable control means for controlling said last-mentioned air inlet means, fuel injection means provided within at least some of the air channel sections of the second propulsion unit cycle for additionally reinforcing the lift effect, and after-burner means in the horizontal thrust channel means of the first propulsion unit stage.

21. A two-cycle gas turbine jet propulsion unit, for propelling vertical take-off and short take-off aircrafts, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means and, on the other, in lift channel means, and control means in said channel branching means and operable to selectively control the opening and closing of said thrust and lift channel means, a second propulsion unit cycle including lift compressor rotor means operable to draw in atmospheric air for said second stage and supply the same to said lift channel means, and air inlet means for said lift channel means disposed along the circumference of the propulsion unit, and said lift compressor rotor means carrying radially outwardly thereof air compressor blade means, raradially centrally thereof turbine blade means and radially inwardly thereof a set of spokes that are aerodynamically substantially ineffectual and rotate within said horizontal thrust channel means, said lift channel means including elbow section means which is supplied with propulsion gases of the first propulsion unit cycle and with air of the second propulsion unit cycle, the air inlet means of the second stage effectively taking place approximately over the entire circumference of the propulsion unit, and adjustable control means for controlling said last-mentioned air inlet means.

22. A two-cycle gas turbine jet propulsion unit, for propelling vertical take-off and short take-off aircrafts, comprising:

a first propulsion unit cycle including air compressor means, combustion chamber means operatively connected with said air compressor means, and compressor-drive turbine means operatively connected with said combustion chamber means, a channel system including channel branching means operatively connected with the output of said turbine means and continuing, on the one hand, in horizontal thrust channel means extending substantially in the longitudinal axis of the propulsion unit and, on the other, in lift channel means having a first section operatively connected with said channel branching means and surrounding said horizontal thrust channel means substantially coaxially, a second section surrounding said first section and elbow section means operatively connected with said first and second sections and bent approximately at right angle to said longitudinal axis, and control means in said channel branching means and operable to selectively control the opening and closing of said thrust and lift channel means.

a second propulsion unit cycle including lift compressor rotor means operable to draw in atmospheric air for said second stage and supply the same to said lift channel means, and air inlet means for said lift channel means disposed along the circumference of the propulsion unit, and said lift compressor rotor means carrying radially outwardly thereof air compressor blade means, radially centrally thereof turbine blade means and radially inwardly thereof a set of spokes that are aerodynamically substantially ineffectual and rotate within said horizontal thrust channel means, said lift channel means including elbow section means which is supplied with propulsion gases of the first propulsion unit cycle and with air of the second propulsion unit cycle, the air inlet means of the second stage effectively taking place approximately over the entire circumference of the propulsion unit, and adjustable control means for controlling said last-mentioned air inlet means, fuel injection means provided within the lift channel means for reinforcing the lift effect, and two lateral downwardly and outwardly directed pivotally arranged thrust nozzle means provided at the end of the elbow section means.

23. In a two-stage gas turbine jet propulsion unit, for propelling vertical take-off and short take-off aircrafts, which includes a first propulsion unit cycle with air compressor means, combustion chamber means and compressor-drive turbine means; a channel system including a channel bifurcation operatively connected with the output of said turbine means and continuing, on the one hand, in a horizontal thrust channel and extending substantially in the longitudinal axis of the propulsion unit and, on the other, in lift channel bent at an angle to said longitudinal axis, and control means in said bifurcation operable to selectively control the opening and closing of said thrust and lift channels; and a second propulsion unit cycle including lift compressor rotor means operable to draw in atmospheric air for said second cycle and supply the same to said lift channel, and air inlet means for the second cycle disposed along the circumference of the propulsion unit, the improvement essentially consisting of blade means carried by said lift compressor rotor means including air compressor blade means disposed radially outwardly thereof, a set of spokes radially inwardly thereof that are aerodynamically substantially ineffectual and rotate within said thrust channel means, and turbine blade means intermediate said air compressor blade means and said spokes, said lift channel including an initially approximately longitudinally directed and subsequently downwardly bent lift-channel branch which is supplied with propulsion gases of the first propulsion unit cycle and with air of the second propulsion unit cycle, fuel injection means provided within at least some of the air channel sections of the second propulsion unit cycle, and after-burner means in the thrust channel of the first propulsion unit cycle.

References Cited by the Examiner

UNITED STATES PATENTS

| | | | |
|---|---|---|---|
| 2,428,330 | 9/1947 | Heppner | 60—35.6 |
| 2,430,399 | 11/1947 | Heppner | 60—35.6 |
| 2,441,488 | 5/1948 | Howell | 60—35.6 |
| 2,454,738 | 11/1948 | Hawthorne | 60—35.6 |
| 2,505,660 | 4/1950 | Baumann | 60—35.6 |
| 3,117,750 | 1/1964 | Snell | 244—23 |

FOREIGN PATENTS 1,119,675  12/1961  Germany.

MARK NEWMAN, *Primary Examiner.*